UNITED STATES PATENT OFFICE
PTO – BOYERS, PA DUTY STATION

---

PAGE NOT AVAILABLE

PATENT NUMBER 9898 FOR THE ISSUE DATE 7 12 1836 HAS BEEN SCANNED/LOADED, BUT WITH MISSING PAGE(S). UPON RECEIPT OF THE MISSING PAGE(S), THE ENTIRE DOCUMENT WILL BE RESCANNED. THIS NOTICE IS FOR THE MISSING PAGE CONTAINING:

Missing ALL Drawings

DATA CONVERSION OPERATION
BOYERS, PA

Sater T. Walker.

The Schedule referred to in these Letters Patent, and making part of the same
containing a description in the words of the said Sater T. Walker himself
of his improvement in the Hydrant for drawing Water.
To all to whom these presents shall come Be it known, That I Sater
T. Walker of the City & County of Baltimore & State of Maryland have
invented a new improvement in "the Hydrant for drawing water"
Which Hydrant I have already patented under date of the twenty sixth
of November, in the year eighteen hundred and thirty five, and that the
following is a full and exact description of the construction & operation of
the said improvement as invented by me. The said invention consists
of a cast iron case which will be usually cast [illegible] surround the
works so as to afford them the requisite protection. It is also used for
the purpose of maintaining the distance between the upper and lower
ends of the works, lest they should be separated by frost or other cir-
cumstances. The ascending tubes from the supply pipes from which
the water is discharged is as usual supported by means of a cast iron
leg, according to my old mode of construction; but I have adopted
a cast iron case, with openings in one or more of its sides, at the base near
its bottom, for the purpose of approaching the cock at the lower end,
whenever it may be requisite to do so; and for supporting the valve
seat or cock. The spear or shaft described in my former patent,
as passing down from the top of the Hydrant to the valve seat, has
a screw on its upper end which passes into or through a nut plate,
or the covering affixed to the upper end of the cast-iron case, and on
turning the spear as usual the valve is raised or closed. I insert
the waste cock, when that is used, within the opening in the cast iron
case under ground, and turn off the water according to my former plan.
When I use the lining of some pliable substance, in the cock and in
the valve seat, I generally prefer leather saturated with bees wax
and apply it to the Hydrant, or the plug cocks, by attaching it
firmly to the body or plugs of the cocks. When I use the metal
cocks, if one are enlarged, I [illegible] for the use of the fire plugs and within
to operate it within the cast iron case, I make the discharging [illegible]

9898X the cock to turn upwards within the body of the case, and from it is a tube
rid, so as to receive the spigot end of the ascending pipe to which I attach
two or more nozzles for the discharging of the water by, so as to be able to
attach two or more hose to the same plug, or for the purpose of having a
convenient mode of attachment at or near the surface of the ground.
It also answers in this case to increase the head of water, and remove the
possibility of obstruction of the flow of water, from a bend or pressure that
might otherwise be in the hose when elevated. To the other end of
the cock I form a tube and unite it to the supply pipe by a
circular piece intended for the purpose of uniting the front of the case, and
the discharging pipe; so as to discharge the water in the same direction it
has received from. I use the coupling joints for connecting the pipes, as
in my old patent, for the purpose of affording a ready means of detaching
them from the cock or valve seat. To prevent at all times the same
distance between the upper and lower ends of the works; to prevent dis-
ocation by frost or other circumstances, as before stated, the cock or valve
seat, is placed in the opening in the lower end of the iron case, and the
nut plate, or covering in which the spear or shaft works, which is used
for holding the valve, I therefore use for turning the plug of
the cock, has a screw cut in it, and receives into it the male or upper end
of the spear, where the lever is attached. What I claim as my invention
in this case for which I now ask Letters Patent, is the construction and
use of a cast iron case for the purpose of maintaining the distance
and security, either with or without the Mathew leg, of the iron case
for protecting the other works of the apparatus, and the plug from
injuries. But when it is used as a covering, it is plain against the
other works without the connection for maintaining the distance. The
the confining down of the top by means of screw bolts and nuts, in order
to assist in easing and lightening the works. I claim for adding nozzles or
mouthpieces to the discharging pipes for the purpose before mentioned,
in describing the plug. Also for the manner of using a circular
piece to the plug for securing the nozzles or pipes of the discharging
pipes as aforesaid.

Walter J. Walker

Thos. J. Pettigrew } Witness
William Crosfield }

[558 words

Patent 29th July 1835